United States Patent [19]

Simonson

[11] 4,139,472
[45] Feb. 13, 1979

[54] FILTER SECTOR

[76] Inventor: Gordon L. Simonson, Box 17, Frederic, Wis. 54837

[21] Appl. No.: 808,308

[22] Filed: Jun. 20, 1977

[51] Int. Cl.² .............................................. B01D 39/00
[52] U.S. Cl. .................................... 210/232; 210/331; 210/347; 210/486
[58] Field of Search ................ 210/486, 232, 347, 331

[56] References Cited

U.S. PATENT DOCUMENTS

| 3,193,105 | 7/1965 | Putham | 210/486 X |
| 3,283,906 | 11/1966 | Crane et al. | 210/232 |
| 3,643,803 | 2/1972 | Glos | 210/232 |
| 3,917,534 | 11/1975 | Moore | 210/486 |

FOREIGN PATENT DOCUMENTS 1384810  11/1964  France ...................................... 210/486

Primary Examiner—Frank A. Spear, Jr.
Attorney, Agent, or Firm—Merchant, Gould, Smith, Edell, Welter & Schmidt

[57] ABSTRACT

A filter sector about which a bag-type filter is secured is disclosed for use in a rotary disc filter structure. The filter sector is a generally wedge-shaped panel having oppositely disposed planar surfaces. A plurality of substantially cylindrical projections are affixed to the planar surfaces and have contact surfaces which support the bag filter spaced apart from the planar surfaces. A plurality of elongated ribs extend between an apex end portion and an arcuate end portion of the panel and are spaced apart to define a plurality of independent flow channels for filtrate drawn through the bag filter. A collar assembly is provided for connecting the filter sector to a filtrate discharge conduit.

8 Claims, 13 Drawing Figures

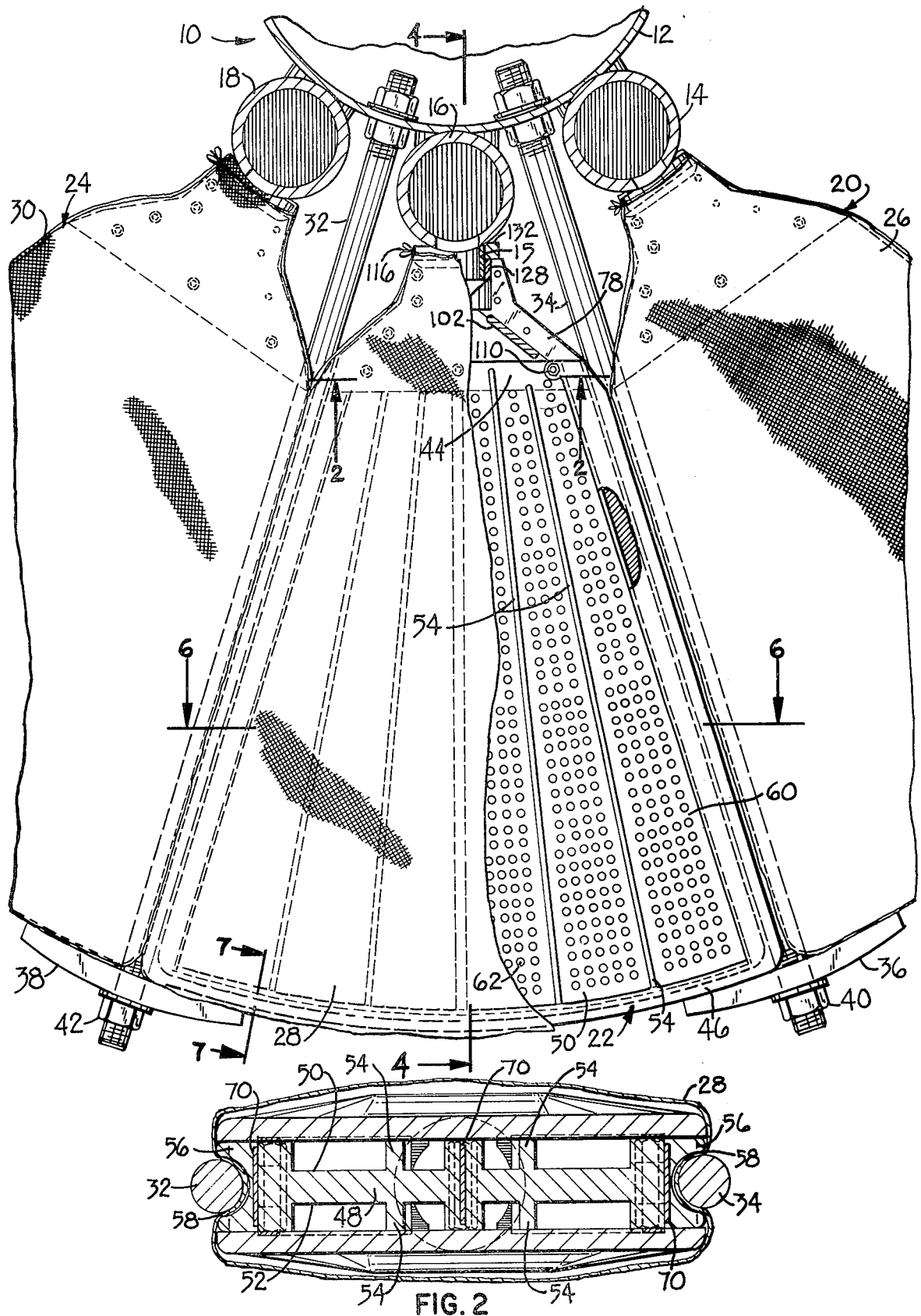

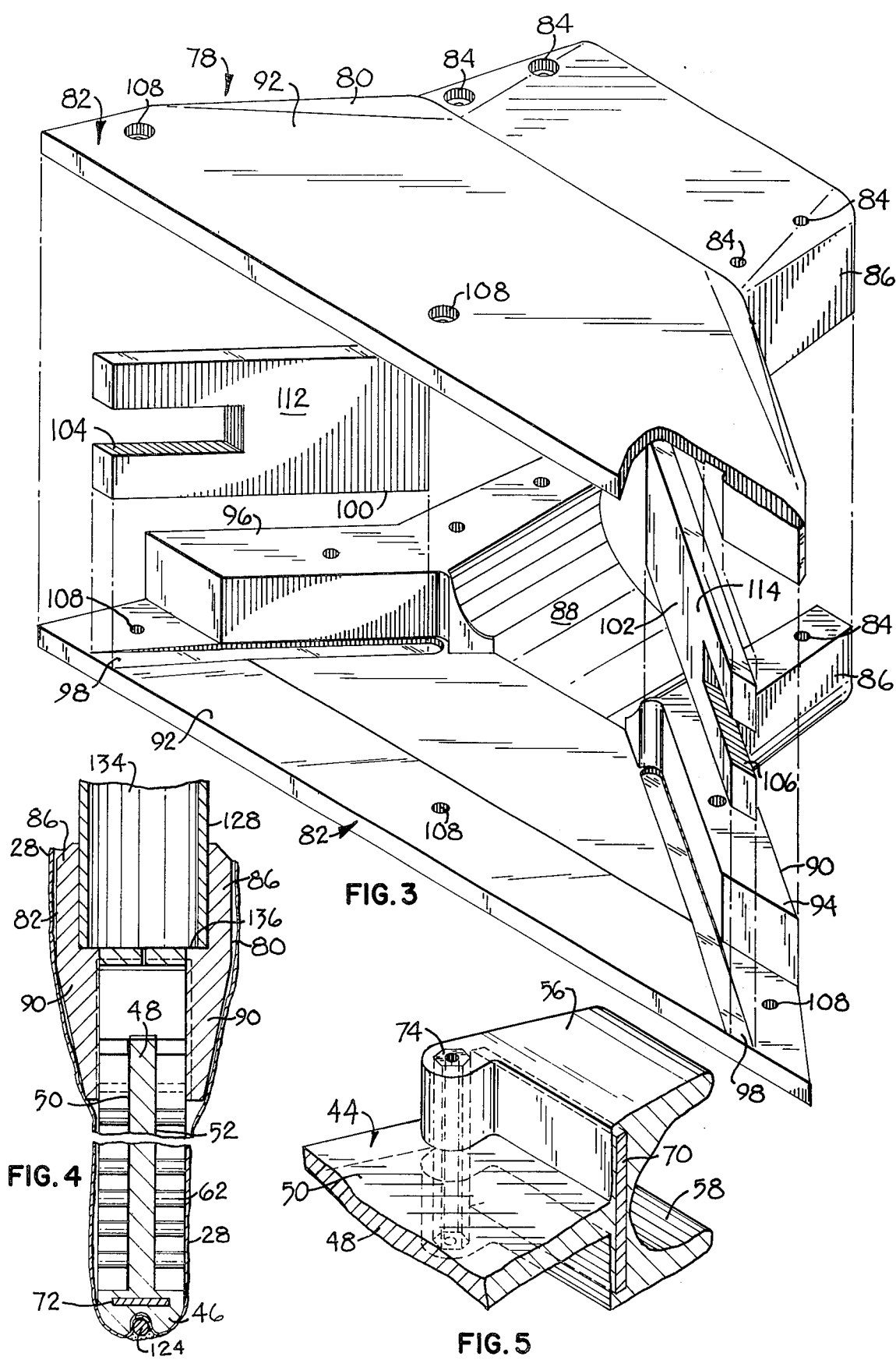

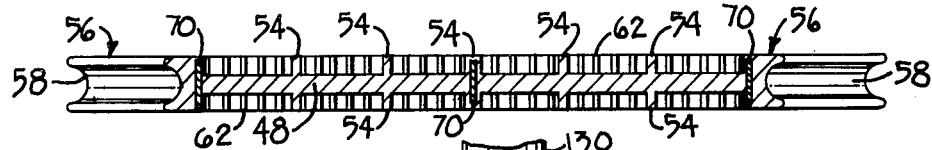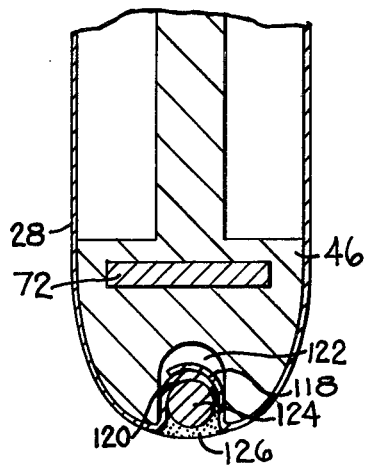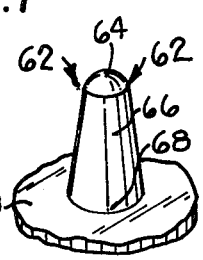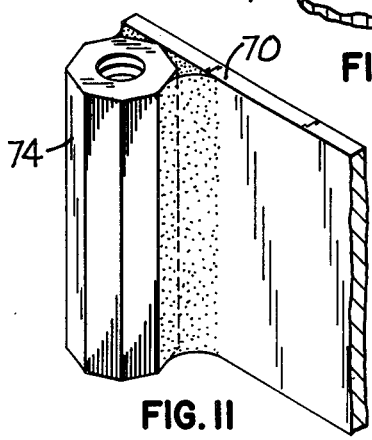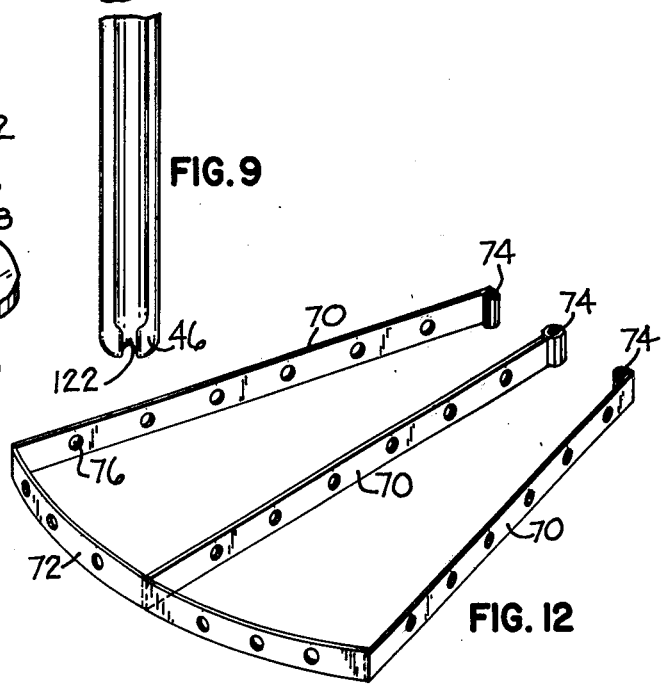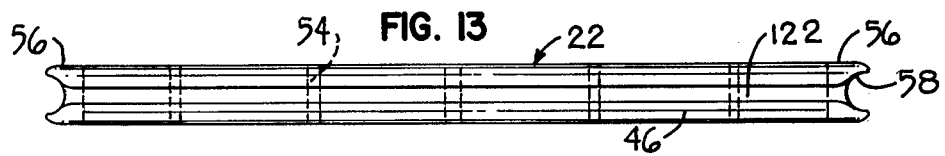

FILTER SECTOR

BACKGROUND OF THE INVENTION

The present invention relates broadly to filter apparatus utilized during the processing of various ores, and, in particular to an improved filter sector for use in a rotary disc filter structure to remove water from an aqueous suspension of ore.

During the processing of ore for the purpose of extracting minerals, numerous grinding, cleaning, and separation processes are conducted. The end product of these processes is frequently a mineral ore concentrate in an aqueous suspension or slurry. The aqueous suspension or slurry must be subjected to successive dewatering or filtering processes to obtain a dry ore concentrate for pelleting or other purification processes. One such filtration process utilizes a rotary disc filter structure which includes a plurality of wedge-shaped filter sectors each of which is covered by a filter bag. The filter sectors are rotated into and out of the slurry or aqueous suspension. Alternately vacuum or pressurized air is applied to draw water through the filter bag accumulating cakes ore concentrate thereon and to provide pressurized air to expand the size of the filter bag causing the ore concentrate to drop off into collection bins.

Since fine particles and also drawn through the filter bag, the filter sector is subjected to abrasion and wear and severe flex stressing due to the cyclic application of vacuum and compressed air. The prior art includes a number of filter sectors which are constructed of heavy metallic materials which are particularly difficult to handle during the relatively frequent changes of the filter bag. The prior art also includes a number of filter sector structures constructed of lighter weight materials but which do not have the ability to withstand the flex stressing as effectively as the metal filter sectors.

The present invention overcomes these disadvantages of the prior art apparatus in that it is an improved filter sector molded of a lightweight elastomeric material having integral, preferably steel, reinforcing ribs that provide the structural stability and rigidity of the filter sector. The present invention also includes substantially abrasion-resistant wear plates disposed at heavy wear positions to increase the time between replacement of parts. The filter sector of the present invention achieves a substantially increased drying efficiency by supporting the filter bag such that the exposure of the bag to drying air is maximized and the channelling of filtered water from the filter sector to the discharge is optimized.

SUMMARY OF THE INVENTION

The present invention is a filter sector that is a generally wedge-shaped panel which has oppositely disposed planar surfaces and a plurality of substantially cylindrical projecting members affixed to the planar surfaces. The projecting members have a contact surface for supporting a bag-type filter medium. Spaced apart from the planar surfaces the filter sector has an apex end portion, an arcuate end portion and side portions that diverge from the apex end toward the arcuate end. The filter medium and the planar surfaces define a flow chamber therebetween. The filter sector further includes a plurality of spaced ribs which are affixed to and project outward from the planar surfaces. The ribs extend along the planar surfaces between the apex and arcuate end portions dividing the filter sector into a plurality of sub-sectors. The filter sector is molded of a substantially rigid elastomeric material and includes a plurality of metal support members molded integrally therewith.

The improved disc sector of the present invention also includes means for securing the disc sector to a filtered water discharge conduit. The securing means includes a symmetrical two-piece collar assembly having a first portion with a substantially cylindrical inner side wall defining an axial passageway through which the filtered water is discharged and a second portion having an inlet end and inner side walls that define a funnelling chamber communicating with the axial passageway. The filter sector is secured to the second portion of the collar assembly within the inlet end thereof. A pair of replaceable wear plates are fixed within the second portion of the collar assembly, the wear plates having wear surfaces disposed to direct the filtered water into the first portion of the collar assembly.

In the preferred embodiment, the filter sector is molded of of polyurethane material while the wear plates may be either polyurethane, an abrasion resistant steel, or ceramic material. The metal reinforcing ribs are typically steel. The ribs extending between the apex end portion and arcuate end portion divide the filter sector into sub-sectors that define independent flow channels for filtered water to the collar assembly. The substantially cylindrical projecting members support the bag filter medium such that the filter has maximum surface area exposed to the drying vacuum applied to the filter sector.

Thus, it can be seen that the present invention provides a lightweight structural rigid filter sector with optimum drying characteristics and long-life abrasion resistant wear plates. The filter sector is relatively easy to handle for replacement of the filter bag, collar assembly, or wear plates. These and other advantages of my invention will become apparent with reference to the accompanying drawings, detailed description of the preferred embodiment, and claims.

BRIEF DESCRIPTION OF THE DRAWINGS

FIG. 1 is a partial elevational view of a rotary disc filter structure incorporating the present invention with a portion thereof broken away to show the improved filter sector;

FIG. 2 is a sectional view of the filter section of the present invention taken along line 2—2 of FIG. 1;

FIG. 3 is a view in perspective of the collar assembly of the present invention;

FIG. 4 is a sectional view taken along line 4—4 of FIG. 1;

FIG. 5 is an enlarged fragmentary view of a corner of the filter of the present invention illustrating the integrally molded reinforcing members and hexagonal nut fasteners;

FIG. 6 is a sectional view taken along line 6—6 of FIG. 1;

FIG. 7 is an enlarged fragmentary sectional view taken along line 7—7 of FIG. 6;

FIG. 8 is an enlarged fragmentary detail of the connection of the collar assembly to the water discharge conduit;

FIG. 9 is a side elevational view of the filter sector of the present invention;

FIG. 10 is a view in perspective of the substantially cylindrical projections of the filter sector;

FIG. 11 is an enlarged fragmentary view in perspective of one end of the support members of the present invention;

FIG. 12 is a view in perspective of the support member structure of the present invention;

FIG. 13 is an elevational view of the arcuate end of the filter sector of the present invention.

DETAILED DESCRIPTION OF THE PREFERRED EMBODIMENT

Referring to the drawings, wherein like numerals represent like parts throughout the several view, FIG. 1 illustrates a portion 10 of a rotary disc filter structure incorporating the present invention. The rotary disc filter structure includes a cylindrical drum 12 to which is welded a plurality of filtrate discharge conduits 14, 16 and 18. Although only three discharge conduits are shown, it will be understood that discharge conduits are affixed about the entire circumference of cylindrical drum 12. As shown more particularly in FIG. 8, a tubular mounting member 15 is secured to conduit 16 and is connected to filter sector 22 to provide fluid communication between conduit 16 and sector 22 as will be described in more detail hereafter. Filter sectors 20, 22 and 24 are secured to discharge conduits 14, 16, and 18 respectively. Each such discharge conduit has a filter sector associated therewith. A bag-type filter medium 26, 28, and 30 is attached about filter sectors 20, 22 and 24, respectively. Filter sectors 20, 22 and 24 are firmly held to the discharge conduits by rods as at 32 and 34 that are threaded at both ends, and brackets 36 and 38. One end of rods 32 and 34 is secured to cylindrical drum 12 while brackets 36 and 38 are received within the opposite ends of rods 32 and 34 and secured thereto by fasteners 40 and 42.

A portion of bag-type filter medium 28 has been broken away in FIG. 1 to show the structural detail of the filter sectors. Filter sector 22 will now be described, it being understood that other filter sectors of rotary disc filter structure 10 are identical. As shown particularly in FIG. 1, filter sector 22 is generally wedge-shaped when viewed in plan. Sector 22 has a truncated apex end portion 44 and an arcuate end portion 46. Extending between and connecting apex portion 44 and arcuate end portion 46 is a substantially planar member 48 as shown in more detail in FIG. 4. Member 48 has a pair of oppositely disposed planar surfaces 50 and 52. Extending from arcuate end portion 46 to apex end portion 44 and affixed to surfaces 50 and 52 are a plurality of outwardly projecting elongated ribs 54. Also extending between apex and arcuate end portions are sector side members 56. Each side member 56 has a longitudinal groove 58 extending between arcuate end portion 46 and apex end portion 44. Ribs 54 divide filter sector 22 into a plurality of sub-sectors, as illustrated at 60. Preferably, sub-sectors 60 will have substantially equivalent dimensions. Extending outwardly from surfaces 50 and 52 are a plurality of projections 62. One such projection is shown in perspective in FIG. 8. In the preferred embodiment, projections 62 are substantially cylindrical and have a slightly rounded top contact surface 64 and an exterior wall 66 which tapers outward from contact surface 64 to a base portion 68 which is affixed to surface 50 or 52. Contact surfaces 64 of projections 62 support the bag-type filter medium 28. As illustrated more particularly in FIG. 1, the number of projections 62 in a circumferential row of filter sector 22, i.e., a row between side members 56 taken along a radius of curvature, decreases from arcuate end portion 46 toward apex end portion 44. Since the spacing between ribs 54 decreases from end portion 46 toward apex portion 44, it is necessary to decrease the number of projections 62 such that substantially unimpeded flow of filtered water through each sub-sector is achieved. In particular, with reference to sub-sector 60 each row proximate arcuate end portion 46 has five (5) projections 62. As the width between adjacent ribs 54 becomes narrower toward apex end portion 44 the number of projections 62 per row decreases from five to one in increments of one. It will be understood that larger sectors 22 may incorporate more than five (5) projections 62 in the outermost rows.

In the preferred embodiment filter sector 22 is molded of a lightweight elastomeric material, for example, polyurethane. To achieve the desired structural ridigity, a plurality of metal, typically steel, reinforcing ribs 70 are embedded within side members 56 and selected ribs 54 and extend radially from apex end 46 to arcuate end portion 44. In the filter sector disclosed in the drawings, three such radial reinforcing ribs are shown. However, it is to be understood that any number of such reinforcing ribs could be provided as desired. As shown in FIG. 11, an arcuate reinforcing rib 72 is provided for arcuate end portion 46. Radial reinforcing ribs 70 terminate at and are affixed to arcuate reinforcing rib 72. Affixed to the opposite ends of radial reinforcing ribs 70 are hexagonal nuts 74, the function of which will be discussed in more detail hereafter. Reinforcing ribs 70 and 72 may be provided with a plurality of apertures 76 to facilitate the molding of filter sector 22 about the reinforcing rib structure. More particularly, with the elastomeric material in a substantially liquid state, it will easily flow through apertures 76 into the desired structure. When the elastomeric material hardens ribs 70 and 72 will be rigidly embedded therein. FIG. 5 is an enlarged fragmentary detail showing one reinforcing rib 70 and hexagonal nut 74 within filter sector 22 at apex end portion 44.

To connect filter sector 22 to tubular mounting member 15, a collar member 78 is provided. Collar member 78 is shown in more detail in the exploded perspective view of FIG. 3. Collar member 78 is a two-piece replaceable member having first and second symmetrical elements 80 and 82 which are secured together by fasteners received in threaded apertures as indicated at 84. One element 82 will now be described, it being understood that element 80 is identical to element 82. Element 82 includes a first portion 86 which has a substantially cylindrical inner side wall 88. Element 82 has a second portion 90 which comprises a plate 92 and side members 94 and 96. A pair of elongated slots 98 are provided in plate 92 for receiving a pair of wear plates 100 and 102. Wear plates 100 and 102 have slots 104 and 106 therein which receive the truncated end of apex end portion 44 of filter sector 22. Wear plates 100 and 102 are formed of an abrasion resistant material, such as ceramic, abrasion resistant steel, or polyurethane material. Plate 92 has threaded apertures 108 which are aligned with hexagonal nuts 74 embedded within filter sector 22. Filter sector 22 is thus secured to collar member 78 by threaded fasteners, as at 110, which are received within apertures 108 and hexagonal nuts 74. Wear plates 100 and 102 provide wear surfaces 112 and 114 which are exposed to the flow of filtered water from filter sector 22. Plates 92 and wear plates 100 and 102 funnel the filtered water into first portion 86 of collar member 78.

The attachment of bag-type filter medium 28 is illustrated in more detail in FIGS. 1, 2 and 7. Bag-type filter medium 28 is secured about collar member 78 by a string or rope tie 116. The bag-type filter medium 28 is stretched over filter sector 22 and is supported above surfaces 50 and 52 by contact surfaces 64 of projections 62. Bag-type filter medium 28 has a pair of free ends 118 and 120 which are overlapped at arcuate end portion 46. Overlapped free ends 118 and 120 are secured within a groove 122 formed within end portion 46. A rope 124 is forced within groove 122 to secure free ends 118 and 120 therein. An adhesive material 126 can also be supplied to firmly retain rope 124 and free ends 118 and 120 within groove 112. As shown in FIG. 2, bag-type filter medium 28 is also secured between rods 32 and 34 and filter sector 22 within grooves 58 in side members 56.

The connection of collar member 78 to tubular mounting member 15 is shown in FIG. 12. A tubular adaptor 128 is received within first portion 86 of column member 78. Tubular mounting member 15 is received within tubular adaptor 128. An O-ring seal 132 is provided about tubular mounting member 15 and is compressed against discharge conduit 16 by adaptor 128. Tubular adaptor 128 defines a discharge passageway 134 for filtered water. As shown in FIG. 4, at the juncture of first portion 86 and second portion 90 of symmetrical elements 80 and 82 and engagement surface 136 is formed on which tubular adaptor 128 rest. The force to hold tubular adaptor 128 and first portion 86 against O-ring 132 is supplied by brackets 36 and 38 tightened against filter sector 22 by threaded fasteners 40 and 42 on rods 34 and 32.

The operation of the present invention will now be described with particular reference to filter sector 22. Referring to FIG. 1, it will be assumed that cylindrical drum 12 is rotated counterclockwise as shown by the arrow such that filter sector 22 is selectively immersed and removed from an aqueous suspension or slurry containing the ore from which it is desired to remove the water. Conduit 16 alternatingly applied a vacuum or compressed air to filter sector 22 from a vacuum blower or compressed air source (not shown). When sector 22 is immersed into the slurry, vacuum is applied through conduit 16 drawing water through the bag-type filter medium 28. The ore in the aqueous suspension becomes caked to the exterior surface of the bag while the water filtrate is held within sub-sectors 60 between bag-type filter media 28 and planar member 48. Filtered water will continue to be drawn through bag filter 28 until bag 28 becomes substantially caked with ore concentrate. Filter sector 22 continues to rotate out of the aqueous suspension exposing the caked ore concentrate to the atmosphere for a drying period. Vacuum continues to be applied through discharge conduit 16 and the water entrapped within filter sector 22 flows from arcuate end portion 46 toward apex end portion 44. Water integrity between sub-sectors is maintained by ribs 54 which prevent water from one sub-sector from dropping into a lower sub-sector as the filter sector 22 is rotated out of the slurry. Each sub-sector 60, therefore, defines an independent flow channel for water filtrate into collar member 78 and discharge conduit 16. Projections 62 support bag filter 28 on contact surfaces 64 such that a substantial portion of the bag-type filter medium is exposed to the vacuum facilitating the rapid drying of the bag filter and caked ore concentrate.

Pressurized air is fed through conduit 16 into filter sector 22 to expand bag-type filter media 28 and drive the dried ore concentrate from the surface of the filter into collection bins (not shown). The cycle can then be repeated to collect additional ore concentrate as the filter sector 22 is again immersed in the aqueous suspension of ore and water. In the present invention, the bag-type filter medium may be any suitable woven fabric such as cotton. Other materials are also contemplated within the scope and spirit of the present invention.

As previously mentioned, second portions 90 of symmetrical collar elements 80 and 82 funnel the water filtrate into tubular adaptor 128 which feeds into discharge conduit 16. Wear plates 100 and 102 are formed of substantially abrasion resistant material to deal with the abrasive action of fine particles that remain entrapped in the filtered water. Wear plates 100 and 102 are designed for a long life, but can be easily replaced once wear surfaces 112 and 114 are worn away by the abrasive action of the fine particles.

During the operation of the present invention, the bag-type filter medium and the wear plates are typically items which must be replaced periodically. The relatively light weight of the filter sectors facilitate the replacement of these parts. Brackets 36 and 38 can simply be removed releasing the filter sector 22 allowing removal and replacement of bag filter 28. Fasteners 110 are removed to disconnect apex end portion 44 from collar member 78 so that wear plates 100 and 102 can be removed and replaced.

The repetitive application of a vacuum and compressed air to filter sector 22 subjects the elastomeric material to somewhat severe flex stressing. Steel reinforcing ribs 70 and 72 maintain the structural integrity and rigidity of sector 22 while sector 22 undergoes such flex stresses. The next most frequent item requiring replacement is collar member 78 which as can be seen is an easily replaceable and relatively inexpensive item of manufacture. Wear plates 100 and 102 help prolong the life of collar 78 by providing abrasion-resistive wear surfaces 112 and 114. As previously mentioned, bag-type filter medium 28 is subject to maximum open space between contact surfaces 64 to enhance the drying of ore caked to the exterior surfaces of the bag. The division of filter sector 22 into sub-sectors 60 provides optimum channelling of the filtered water toward collar member 78 also enhancing the drying capabilities of the present invention. As the filter sectors are rotated out of the slurry, ribs 54 prevent water from gravitating between adjacent filter sectors. The present invention, thus, provides an improved filter sector which is relatively lightweight yet maintains its structural integrity under repeated flex stressing. Additionally, the improved filter sector of the present invention provides for improved drying characteristics and additionally has abrasion-resistant elements that increases the time between replacement of key parts. While specific structure has been disclosed, it will be understood that alternative equivalent structures are within the scope of the present invention.

What is claimed is:

1. In a rotary disc filter structure wherein a plurality of disc sectors are provided for support of a bag-type filter medium, each of said sectors connected to a filtrate discharge conduit and rotatable into a slurry, said structure including vacuum means for drawing water from said slurry through said bag-type filter medium, said filtered water being channeled by said sectors to said discharge conduit, an improved disc sector comprising:
(a) a generally wedge-shaped base member having an inner discharge end portion, an arcuate outer end portion, a pair of oppositely disposed substantially planar surfaces, and side wall portions;
(b) a plurality of elongated ribs affixed to and relatively widely spaced apart on said planar surfaces and extending between said discharge and said arcuate end portions, said ribs and said planar surfaces defining a plurality of sub-sectors; and
(c) a plurality of projecting members affixed to said planar surfaces and spaced apart and aligned thereon in a plurality of radially spaced rows within each sub-sector, the number of members in each radial row decreasing from said outer end portion toward said inner end portion, each of said projecting members having a contact surface for supporting said bag-type filter medium, said filter medium and said planar surfaces defining a filtrate flow chamber therebetween, said ribs dividing said flow chamber into a plurality of independent flow channels.

2. An improved disc sector in accordance with claim 1 further comprising means for securing said disc sector to said filtrate discharge conduit, said securing means defining a discharge passageway for channeling filtered water from said filter sector into said discharge conduit.

3. An improved disc sector in accordance with claim 2 wherein said securing means is a collar assembly having a first portion having a substantially cylindrical inner side wall defining an axial passageway therethrough, said first portion secured to said discharge conduit, such that said axial passageway is in fluid communication with said discharge conduit, and a second portion having an inlet end and inner side walls that define a funnelling chamber communicating with said axial passageway, said filter sector secured to said second portion within said inlet end thereof whereby filtered water from said flow channels is discharged into said funnelling chamber.

4. An improved disc sector in accordance with claim 3 further comprising wear plate means formed of abrasion resistant material and affixed within said funnelling chamber, said wear plate means having wear surfaces disposed to direct filtered water into said axial passageway of said first portion of said securing means.

5. An improved disc sector in accordance with claim 4 wherein said collar assembly further comprises two symmetrical members secured together by fastening means to define said first and said second portions.

6. A filter sector about which a bag-type filtering medium is secured comprising:
(a) a generally wedge-shaped panel formed of a substantially rigid elastomeric material having a plurality of metal support members molded integrally within said panel, said panel further having oppositely disposed planar surfaces, an apex end portion, an arcuate end portion, and side portions which diverge from said apex end toward said arcuate end;
(b) a plurality of elongated ribs affixed to and projecting outward from said planar surfaces, said ribs spaced relatively widely apart and extending along said planar surface between said apex end portion and said arcuate end portion, said ribs dividing said sector into a plurality of sub-sectors, each sub-sector defining an independent filtrate flow channel; and
(c) a plurality of substantially cylindrical projecting members affixed to said planar surfaces and spaced apart and aligned thereon in a plurality of radially spaced rows within each sub-sector, the number of projecting members in each radial row decreasing from said arcuate end portion to said apex end portion, each of said projecting members having a contact surface supporting said bag-type filter medium in spaced apart relationship from said planar surfaces.

7. A filter sector in accordance with claim 6 wherein said metal support members extend between said apex and said arcuate end portions of said sector within said elongated ribs and further comprising a metal support member extending about said arcuate end portion.

8. A filter sector in accordance with claim 7 wherein said metal support members are provided with a plurality of apertures.

* * * * *